United States Patent [19]
Sukhov et al.

[11] 3,823,645
[45] July 16, 1974

[54] MILLING MACHINE

[76] Inventors: Ivan Alexeevich Sukhov, Pudozhskaya ulitsa 4a, kv. 22; Nikolai Matveevich Sjundjukov, Shkolnaya ulitsa 3, kv. 15; Igor Nikolaevich Soloviev, ulitsa Stoikosti, 2/11, kv. 227, all of Leningrad, U.S.S.R.

[22] Filed: May 23, 1973

[21] Appl. No.: 363,049

[52] U.S. Cl. .................................. 90/17, 90/13 A
[51] Int. Cl. ............................................. B23c 3/18
[58] Field of Search ............................. 90/13 A, 17

[56] References Cited
UNITED STATES PATENTS
1,077,279  11/1913  Ito........................................... 90/13 A

*Primary Examiner*—Francis S. Husar
*Attorney, Agent, or Firm*—Eric H. Waters

[57] ABSTRACT

A milling machine is designed for machining the curved surfaces of propelling screws and comprises a turntable with the screw set on it and a fixed gantry along the horizontal guide of which two carriages move to mount bars capable of vertical movement.

The lower end face of each bar gets in contact with a vertical cylindrical insert turnable round its axis.

The lower end face of the insert is made inclined to the horizontal plane.

An overarm is connected to the lower end face of the insert. The longitudinal axis of the overarm is parallel to the lower end face of the insert.

A spindle head with a milling cutter held therein is connected to the overarm coaxially to its longitudinal axis.

The spindle head is capable of turning round the longitudinal axis.

A milling cutter rotation drive is mounted on the overarm.

7 Claims, 4 Drawing Figures

MILLING MACHINE

The invention relates to the milling machines for machining curved surfaces and can find application for example, for a complete machining of the surfaces of blades, hubs and edges of propeller screws of both plain and intricate configuration.

Known in the art are various milling machines for machining the propeller screws. Such milling machines can be classified into two main types:

Milling machines with a column and an overarm mounted thereon using side machining technique.

Gantry-type milling machines using top machining technique.

For example, the Swiss milling machines of the "Escher Wyss" firm and the British milling machines of the "Craven" firm are referred to the former type.

The Japanese milling machines of the Toshiba firm ("Toshiba Machine Co. Ltd.") are reffered to the latter type.

The milling machines of the former type suffer from a number of serious disadvantages. For example, the milling machine of the "Escher Wyss" firm described in Swiss Patent No. 206,784, Class 90, has the following disadvantages: a considerable overhang of the overarm and a great (of the order of 4000 mm) vertical traverse when the base of the overarm moves up and down along the vertical column in the course of machining a propelling screw in its basic position and in the course of its reversal. The insufficient rigidity of such a construction adversely affects the accuracy and equality of machining and reduces the durability of the tool.

Of a more perfect technical design is the milling machine of the Toshiba firm described in Japanese Patent No. 17230/68, Class 74A293 according to the National Patent Classification.

The said milling machine comprises a turntable wherein the propelling screw being machined is clamped, on it, and a fixed gantry on the guides of which two carriages are mounted capable of moving horizontally and carrying rotary bars vertically movable.

On the lower end faces of the bars milling cutters are provided. A cutter rotation drive is provided on the upper face of each bar.

The disadvantages inherent in the milling machine of the Toshiba firm are as follows:

Failure to provide a fully mechanized machining of all the surfaces of blades and hubs of a propelling screw since the position of a cutter can be changed only in the vertical plane (by turning the bar).

Affected quality and accuracy of machining as well as the reduction of the durability of a cutting tool caused by a poor rigidity of the main drive since the drive motor is located at a considerable distance from the cutter which makes the kinematic chain too long.

The object of the present invention is to provide a milling machine the design of which would provide a fully mechanized machining of the surfaces of hubs, edges and blades of propelling screws including the interblade space.

Another object of the present invention is to raise the efficiency of the machining process.

Still another object of the invention is to improve the accuracy and quality of machining of the said surfaces of propelling screws.

Said and other objects are achieved in a milling machine adapted for machining the curved surfaces of propelling screws comprising a frame-mounted turntable carrying the propeller screw clamped to it and a frame-mounted gantry along the horizontal guide of which two carriages move, each of which carrying a vertically movable bar with a device adapted to hold a milling cutter provided with a rotation drive; in which, according to the invention, the cutter holding device contains: a cylindrical insert swivelling round its axis and adapted, when in a vertical position, to be in contact with the lower end face of a bar, the lower end face of the insert being made inclined to the horizontal plane; an overarm connected to the lower end face of the insert in such a manner that its longitudinal axis is parallel to the end face of the insert; and a spindle head, with the cutter fastened in it, connected to the overarm coaxially to its longitudinal axis and capable of turning round the said axis, with a drive of milling cutter rotation being mounted on the overarm.

Swivelling of inserts and overarms makes it possible for spindle heads and, consequently, for cutters to take various angular positions to provide the machining of the curved surfaces in hard-of-access places of a propelling screw.

According to the invention, the overarm can be connected the lower end face of the insert in such a way as to change the angle of inclination of the longitudinal axis of the overarm towards the horizontal plane when the insert turns round its axis, so that the longitudinal axis of the overarm would be all the time in one and the same vertical plane.

This will make it possible to follow the radial inclination of the surface of a propelling screw in the process of machining.

The overarm, according to the invention, can be rigidly connected to the lower end face of the insert which will provide for a better passage of the spindle head with the cutter in the interblade space.

The overarm according to the invention, can also be connected to the lower end face of the insert in such a way as to be capable of turning round the axis perpendicular to the lower end face of the insert.

This will improve the conditions of machining the hubs and edges of a propelling screw.

Inside the overarm along its longitudinal axis, according to the invention, a sleeve may be accommodated, said sleeve being, connected to the rotation drive, while rigidly held to the front face thereof is the spindle head; said sleeve, in turn accommodating the drive shaft with one of its ends kinematically connected to the milling cutter held in the spindle head, while with the other thereof, to the milling cutter rotation drive mounting on the overarm.

This will make it possible to set the milling cutter, in the process of machining, normal to the surface being machined and, thus, to secure a constant width of milling in an axial direction of the screw blade which will enable it to raise the efficiency of milling and the quality of machining, while a short kinematic chain linking the milling cutter with its rotation drive will provide for the rigidity of connection which will improve the quality of the screw surface finish.

The milling cutter in the spindle head, according to the invention, can be held in such a manner as to make the axis of its rotation perpendicular to the spindle head longitudinal axis or to bring said axis in alignment with the spindle head longitudinal axis.

Such an arrangement of the milling cutter in the spindle head will enable various types of milling jobs (face, cylindrical) to be performed, which extends the processing capacities of the milling machine.

The realization of the proposed invention will reduce hard and labour-consuming manual work by introducing maximum mechanization into the process of machining all the surfaces of a propelling screw while the increase of rigidity of the main drives will sharply reduce machining time and raise the machining accuracy and the quality of the surface finish.

Given below is a specific exemplary embodiment of the invention with reference to the accompanying drawings, wherein.

Figure 3:
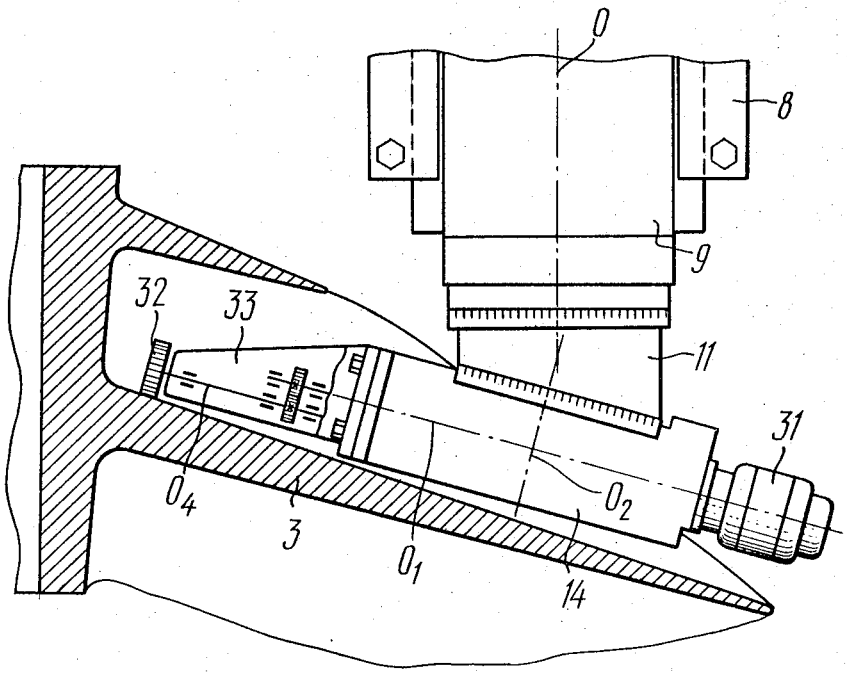
Figure 4:
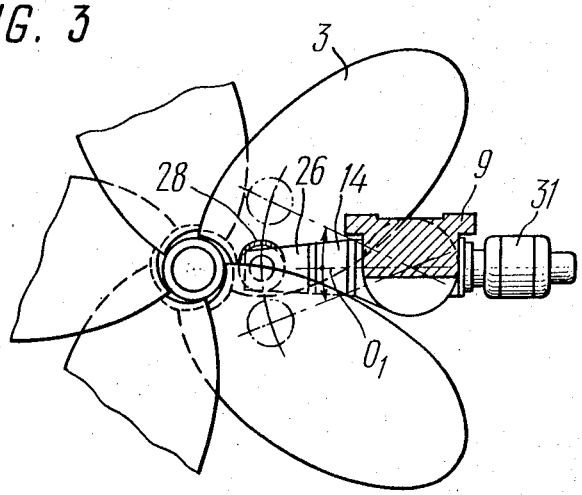

FIG. 3 shows a milling cutter clamping device and the position of the milling cutter in the course of machining the suction back of a propelling screw blade according to the invention front view; and FIG. 4 shows a milling cutter clamping device and the position of the milling cutter in the course of machining the blade in the interblade space of a propelling screw according to the invention, top view.

The proposed milling machine comprises a frame 1 (FIG. 1) on which is mounted a turn table 2 carrying the propelling screw being machined. Also mounted on the frame I is a fixed gantry 4 consisting of two columns 5 and a crossrail 6. The crossrail 6 has a horizontal guide 7 along which two carriages are free to travel, each bearing a bar 9 capable of vertical movement from a drive 10 located on the carriage 8.

Figure 2:
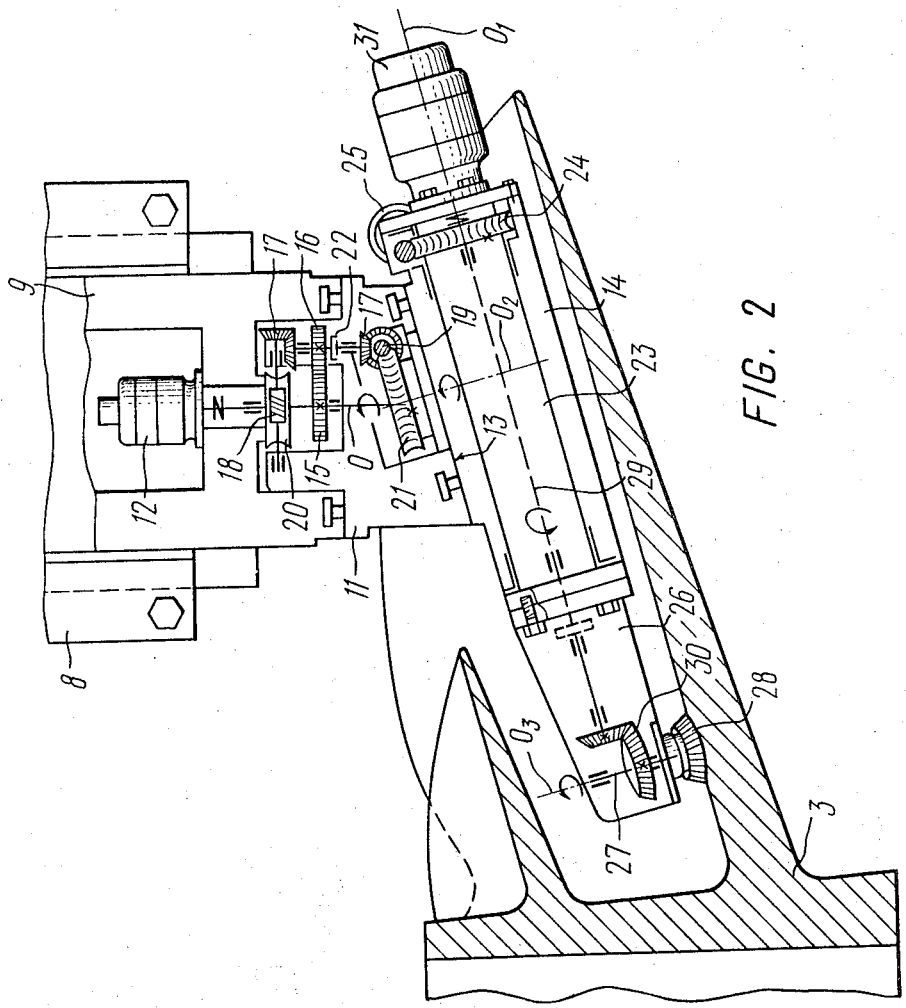
FIG. 2 shows the diagram of a milling cutter clamping device and the position of the milling cutter in the course of machining the driving face of a propelling screw blade according to the invention, front view.

The lower end face of each bar gets in contact with a vertical cylindrical insert 11. The insert 11 (FIG. 2) is turnable round its axis 0 from a drive 12.

The lower end face 13 of the insert 11 is made inclined to the horizontal plane.

An overarm 14 is fastened on the lower end face 13. The overarm 14 is so mounted that its longitudinal axis $0_1$ is parallel to the lower end face 13 of the insert 11. The overarm 14 is capable of turning about an axis $0_2$ which is perpendicular to the end face 13.

The drive 12 of the insert 11 is provided with a sun gear 15 located inside the insert 11 and engaged with a gear 16 to transmit rotary motion through two bevel pairs 17 to worms 18 and 19 which, in turn, are engaged with worm wheels 20 and 21, respectively.

The worm wheel 20 is rigidly fixed on the bar 9 while the worm wheel 21 is rigidly fixed on the overarm 14.

The insert 11 accommodates a clutch 22 placed between the bevel pairs 17.

The overarm (FIG. 2), houses a sleeve 23, arranged along its longitudinal axis $0_1$, said sleeve being connected through a worm pair 24 to a drive 25 of its rotation mounted on the overarm 14.

A spindle head 26 is rigidly coupled with the front face of the sleeve 23 and is coaxial to the longitudinal axis $0_1$ of the overarm 14. The spindle head 26 has a spindle 27 in which a cutter 28 is held.

The sleeve 23 houses a drive shaft 29 one end of which is connected through a bevel pair 30 to the spindle 27 and the milling cutter 28 while the other one, to a rotation drive 31 of the cutter 28, mounted on the overarm 14.

Diverse change spindle heads 26 can be made use of in the herein-proposed milling machine.

The milling cutter 28 can be so held in the spindle head 26 that an axis $0_3$ (FIG. 2) of its rotation be perpendicular to the longitudinal axis $0_1$ of the head 26 or that an axis $0_4$ (FIG. 3) of cutter 32 rotation be parallel to the longitudinal axis $0_1$ of a spindle head 33.

Figure 1:
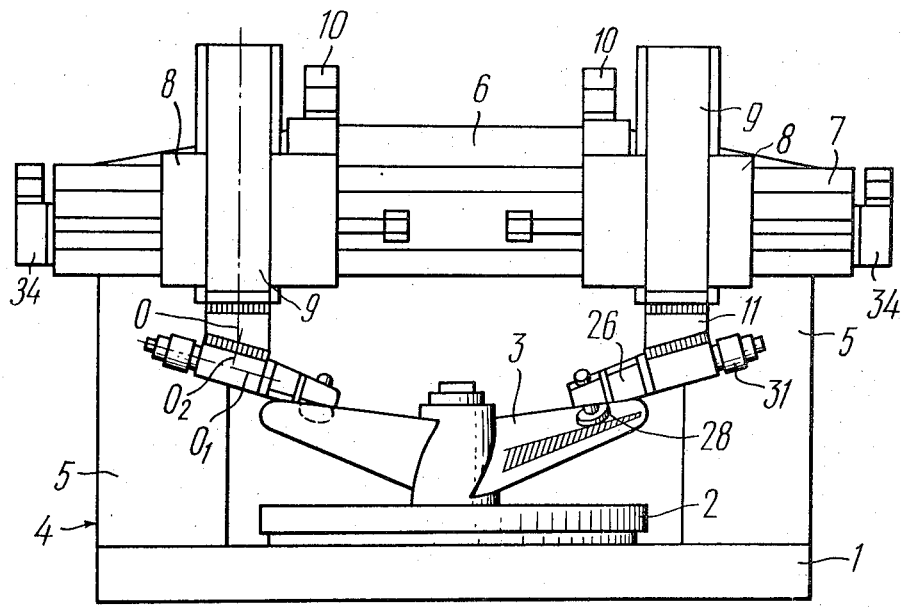
FIG. 1 shows a milling machine according to the invention, front view.

The milling machine of the invention operates as follows:

The propelling screw 3 is held on the turntable 2 (FIG. 1). Rotation of the table 2 imparts motion to the surface of the screw 3 being machined with respect to the milling cutters 28 to which vertical motion is transmitted by virtue of the movement of the bar 9 to suit the contour of the screw 3 in the given section. At the same time rotary motion round the axis $0_1$ is imparted from the drive 25 through the worm pair 24 to the sleeve 23 (FIG. 2) and, consequently to the spindle head 26 with the milling cutter 28 to set the latter normal to the surface being machined which provides for the maximum width of machined area in the course of milling.

In the course of operation the milling cutters 28 obtain rotation from the drive 31 through the drive shaft 29 and the bevel pair 30.

Depending upon the radial inclination of the screw blade surface the overarm 14 is set in the following manner.

The drive 12 imparts rotation to the worms 18 and 19 through the gears 15 and 16 and the bevel pairs 17.

The worm 18 while running over the worm wheel 20, turns the insert 11 whereas the worm 19, while rotating, runs over the worm wheel 21 in the reverse direction, with the result that the angle of inclination of the longitudinal axis $0_1$ (FIG. 2 and 3) of the overarm 14 to the horizontal plane changes, said axis $0_1$ remaining all the time in the same vertical plane.

This makes it possible to continuously follow any change in the radial inclination of the blade surface of the screw 3 being machined.

At a constant radial inclination of the blade of the screw 3 (FIG. 2) the insert 11 and the overarm 14 are rigidly connected to each other with the aid of clamps (not shown in FIG. ).

In such a case, in order to provide for a better passage of the spindle head 26 (FIG. 1 and 4) with the milling cutter 28 in the interblade space of the screw 3 the overarm 14 rigidly connected to the insert 11 is turned round the axis 0, with the clutch 22 disengaged.

The same effect can be attained by turning the overarm 14 round the axis $0_2$ (FIG. 2) which is perpendicular to the lower end face 13. The overarm 14 and the insert 13 have a movable connection while the insert 13 is rigidly coupled with the lower end face of the bar 9.

The overarm 14 (FIG. 2) is turned by the worm 19 (for example, manually or from a separate drive) with the clutch 22 disengaged.

To pass to a next machining belt on the surface of the screw 3 being machined (FIG. 1) the carriages 8 are moved along the guide 7 of the crossrail 6 by a drive 34;

the carriages 8 in turn, move the bars 9 with the milling cutters 28 held thereto. To provide for various kinds of milling, to the end face of the sleeve 23 (FIG. 2) changeable spindle heads are fitted where in the milling cutter 28 (FIG. 2) can be held in such a manner that the axis $0_3$ of its rotation is perpendicular to the longitudinal axis $0_1$ of the head 26 or where in the milling cutter 32 (FIG. 3) is held in the spindle head 33 in such a way that the axis $0_4$ of its rotation is parallel to the axis $0_1$ of the head 33.

The selection of the spindle heads 26 and 33 depends on the kind of milling (face or cylindrical).

The milling machine can operate from a programmed control system or in accordance with copying patterns aided by any follow-up system known in the art.

The utilization of the proposed milling machine will provide for a fully mechanized machining of the surfaces of hubs, edges and blades of propelling screws including the inter blade space. The surface of hard-of-access areas of a screw machined on the proposed milling machine requires no additional manual finish.

Since the proposed design of the milling machine provides for the mobility of a cutter in various directions during the process of machining which makes it possible to set a milling cutter along the radial or circumferential inclination of the surface being machined, the efficiency of the process will raise considerably together with the machining accuracy and quality of screw surface finish.

The utilization of changeable spindle heads enables it to extend the processing capacities of the milling machine which, in turn raises the efficiency and quality of machining.

What we claim is:

1. A milling machine adapted for machining the curved surfaces of propelling screws, comprising: a frame; a frame-mounted turntable on which the screw is set; a gantry fixed to the frame; a horizontal guide arranged in the gantry; at least two carriages moving along the horizontal guide; a bar capable of vertical movement in each of the carriages; a cylindrical insert getting in contact in its vertical position with the lower end face of the bar and capable of turning round its axis, with its lower end being inclined to the horizontal plane; an overarm connected to the lower end of the insert in such a way as to make its longitudinal axis parallel to the lower end face of the insert; a spindle head connected to the overarm coaxially to its longitudinal axis and capable of turning round the said axis; a milling cutter held in the spindle head; an overarm-mounted rotation drive of the milling cutter.

2. A milling machine as claimed in claim 1, in which the overarm is connected to the lower end of the insert in such a way as to change the angle of inclination of the longitudinal axis of the overarm when the insert turns round its axis, with the longitudinal axis of the overarm remaining all the time in the same vertical plane.

3. A milling machine as claimed in claim 1, in which the overarm is rigidly connected to the lower end of the insert.

4. A milling machine as claimed in claim 1, in which the overarm is connected to the lower end face of the insert in such a way as to be capable of turning round the axis perpendicular to the lower end face of the insert.

5. A milling machine as claimed in claim 1, in which provided in the overarm along its longitudinal axis is a sleeve, connected to the rotation drive, to the front face of which the spindle head is rigidly connected; located in the sleeve is a drive shaft one end of which is kinematically connected to the milling cutter held in the spindle head, while the other one, to the milling cutter rotation drive mounted on the overarm.

6. A milling machine as claimed in claim 1, in which the milling cutter is held in the spindle head in such a manner that the axis of its rotation is perpendicular to the longitudinal axis of the spindle head.

7. A milling machine as claimed in claim 1, in which the milling cutter is held in the spindle head in such a manner that the axis of its rotation is parallel to the longitudinal axis of the spindle head.

* * * * *